United States Patent [19]
Oates

[11] 4,091,580
[45] May 30, 1978

[54] PROCESS FOR HOLDING AND CUTTING SHEET GLASS

[75] Inventor: William Lee Oates, Bernardsville, N.J.

[73] Assignee: Timex Corporation, Waterbury, Conn.

[21] Appl. No.: 811,353

[22] Filed: Jun. 29, 1977

[51] Int. Cl.² .......................................... B24B 27/06
[52] U.S. Cl. ............................. 51/283 R; 51/216 R; 51/322; 83/15; 83/22; 83/169; 83/170; 83/171; 83/451; 269/7; 29/559
[58] Field of Search .................... 51/283, 216 R, 322; 125/13 R; 269/7; 83/15, 170, 171, 451, 22, 169

[56] References Cited
U.S. PATENT DOCUMENTS

| | | | |
|---|---|---|---|
| 3,081,586 | 3/1963 | Gersbach | 51/283 |
| 3,083,002 | 3/1963 | Lacey, Jr. | 269/7 |
| 3,218,896 | 11/1965 | McCormick | 269/7 X |
| 3,236,133 | 2/1966 | De Pas | 83/170 |
| 3,574,257 | 4/1971 | Du Bois et al. | 83/170 X |
| 4,016,855 | 4/1977 | Mimata | 51/283 X |

Primary Examiner—Frank T. Yost
Attorney, Agent, or Firm—William C. Crutcher

[57] ABSTRACT

Sheet glass is held for cutting with multiple rotary blades by freezing to a supporting base plate with a liquid, preferably water. The same liquid at a temperature just above freezing temperature is used to cool the blades during cutting, and forms a frozen scale which protects the glass and prevents chipping. After cutting, the liquid is allowed to thaw and releases the pieces without damage or need of special cleaning.

6 Claims, 5 Drawing Figures

PROCESS FOR HOLDING AND CUTTING SHEET GLASS

BACKGROUND OF THE INVENTION

This invention relates to the holding and cutting of sheet glass into smaller pieces with multiple rotary blades. More particularly, the invention relates to an improved process for holding sheet glass, preventing damage during cutting with multiple blade stacks, and releasing the multiple pieces after cutting without damage or need for special cleaning.

It is well known that sheet glass may be cut by scoring and breaking, or by cutting with rotary blade members, incorporating industrial diamonds, or other abrasives. It is also known to utilize multiple blades spaced along a rotatable arbor and to move a work table holding one or more sheets of glass beneath the arbor to perform multiple cuts through the glass.

Conventional methods for holding the glass in place on the work table during cutting are vacuum hold-down systems, or hot wax. If the sheet glass is to be cut into many small pieces, vacuum hold-down systems become progressively ineffective with increasing number of pieces or smaller pieces, since each piece must be held separately. On the other hand, the use of hot wax is time consuming and requires a subsequent cleaning operation with the possibility of damaging the work pieces by surface abrasion.

It would be desirable to firmly hold down the sheet glass during cutting and to hold each piece subsequent to cutting to prevent chipping or scratching during cutting, and to release the work without damage or need of special cleaning afterwards.

Accordingly, one object of the present invention is to provide an improved process for holding and cutting sheet glass with multiple blades.

Another object of the invention is to provide an improved method for holding and protecting sheet glass during a cutting operation.

DRAWINGS

The invention, both as to organization and to method of practice, together with the further objects and advantages thereof, will best be understood by reference to the following description, taken in connection with the accompanying drawings, in which:

FIG. 1 is a side elevation view illustrating the process with equipment depicted in simplified form, FIG. 2 is an end elevation view of the equipment shown in FIG. 1, FIG. 3 is an elevation view partly in section illustrating preparation of the supporting base and sheet glass for cutting, FIG. 4 is a plan view of a piece of sheet glass subsequent to the cutting operation, and FIG. 5 is an enlarged view in cross section illustrating the hold-down and cutting process.

SUMMARY OF THE INVENTION

Briefly stated, the invention is practiced by cooling a supporting base member with a sheet glass thereon in the presence of a liquid so as to freeze the sheet to the supporting base, cutting the sheet glass with a rotary blade while cooling the blade and forming a frozen scale over the sheet glass with the same liquid slightly above its freezing temperature, and subsequently thawing the liquid and removing multiple pieces of glass. Preferably the liquid is water.

DESCRIPTION OF THE PREFERRED EMBODIMENT

Figure 1:
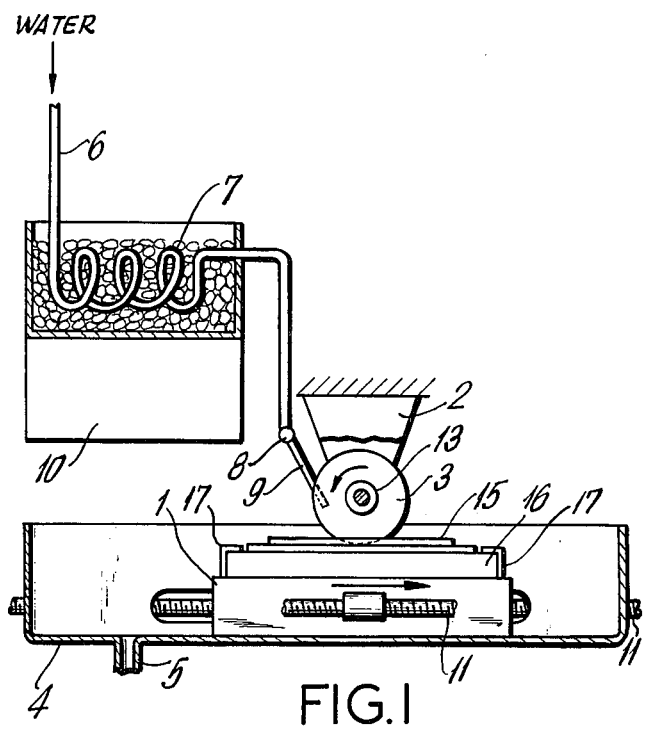

Referring now to FIG. 1 of the drawing, the movable bed 1 of a conventional glass cutting machine is caused to move relative to a fixed bearing support 2. The bearings support a plurality of rotary diamond blade cutters 3. The movable bed 1 is arranged with a suitable collecting pan 4 for collecting spent coolant liquid and discharging it through a drain 5 or collecting and recirculating it. Means are shown for introducing a cooling liquid, shown as a water inlet 6, cooling coils 7, and a manifold 8 with nozzles 9 for directing cooling fluid against blades 3. The coils 7 are arranged to be cooled with a cooling unit 10, the type of unit being not material to the present invention, it being understood that suitable means for controlling the temperature from coils 7 is a part of any such system. An alternative method is to drop dry ice pellets into the cooling water recirculating tank.

Figure 2:
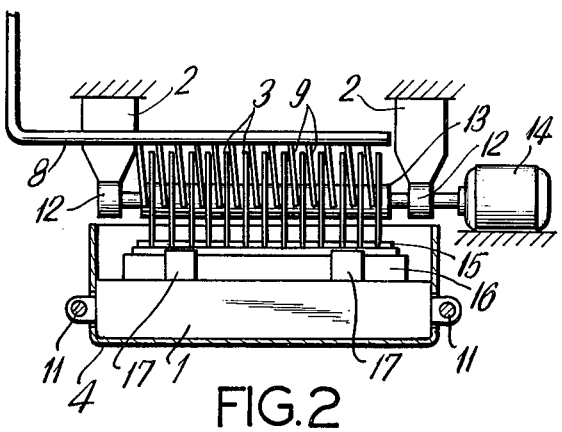

Referring now to FIG. 2 of the drawing, the machine bed 1 is supported by transfer mechanism, such as lead screws or hydraulic cylinders indicated symbolically at 11. The bearing supports 2 hold suspended bearings 12 with an arbor 13 and means to rotate it, such as motor 14. The arbor 13 holds a plurality of the rotary diamond cutting blades 3, each cooled by a nozzle 9.

When a piece of sheet glass, shown at 15 is caused to move past the blades, the glass will be cut into a plurality of smaller pieces in a manner well known in the art. It is also well known to direct a cooling fluid such as water on the blades.

In accordance with the present invention, the method for holding sheet glass 15 is illustrated as a supporting base member 16 with suitable clamps 17 to hold it in place on the bed 1. The base 16 is selected from a material and of sufficient size and thickness to have sufficient thermal capacity to act as a heat sink during the cutting operation, i.e. to resist a change in its temperature. The material of base 16 is also selected to be compatible insofar as its thermal coefficient of expansion is concerned with the thermal coefficient of expansion of the sheet glass. I have found that either brass or aluminum is a suitable material for the base member 16, although other better materials might be stainless steel, Kovar, or titanium. Three or more pegs (not shown) protrude from the upper surface of bed 1, for thermal resistance and prevention of ice formation lifting member 16.

Preparation of the base member and glass consists of wetting the glass sheet 15 or the base member with the fluid to be used for cooling the blades during cutting, in this case water, and then cooling the base member below the freezing point of the fluid while the sheet glass is disposed on the base member.

Figure 3:
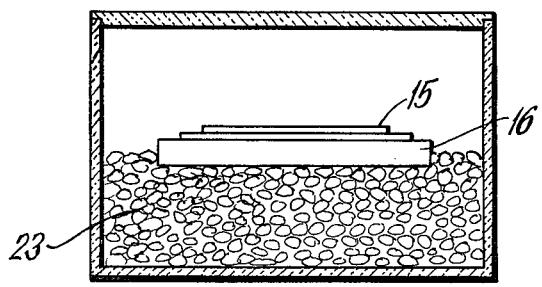

Simplified equipment for doing this which works extremely well is illustrated in FIG. 3 of the drawing, wherein the base member is kept on "dry ice" 10a for a period of time, preferably in a refrigerated room or container. For example, if a piece of glass is wetted, placed on a brass substrate ¼ inch thick and placed directly on a slab of dry ice, which sublimates at $-65°$ C, the glass will freeze to the base member in about 1½ minutes. An intermediate water retaining member, such as a paper towel, may also be used between the glass and the base member with good results. Subsequently if the assembly is placed on a good insulating material, such as wood, it will stay frozen for 8 minutes or so at room temperature after removal from the dry ice.

The resulting "sandwich" of glass and base member is then clamped into the machine bed 1, and the cutting machine is operated to gang cut the glass. The blade stack (rotating) and work support table (on machine) must be kept at constant temperature by continuous flow of cooling water before, during and after the cutting cycle to maintain expansion stability for the stacked blades relative to the work.

The cooling liquid, in this case water, is directed over the blades and onto the glass surface at a temperature which is only slightly above the freezing temperature of the liquid holding the glass to the base member. Here the cooling water is cooled in coils 7 and caused to flow from the nozzles 9 at a temperature of approximately ½° to 1° C. As the cooling fluid flows over the work, a frozen scale or scab forms to completely enclose the top surface of the glass similar to a blister. The base member 16 may be removed and rotated 90° to cut the sheet glass in another direction, with blades of a different pitch, to form rectangles other than square, on another machine if desired.

Figure 4:
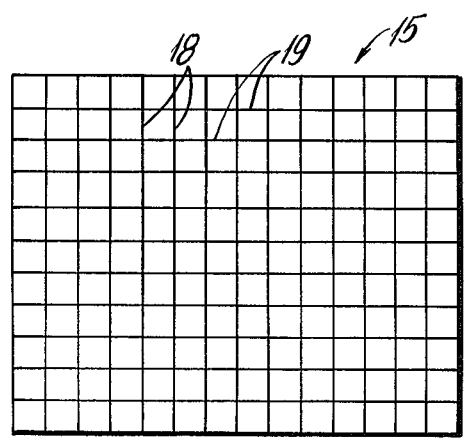

FIG. 4 illustrates a sheet of glass 15, which has been gang cut in one direction as shown by the line 18 and then has been rotated 90° and gang cut in the other direction as indicated by lines 19.

Figure 5:
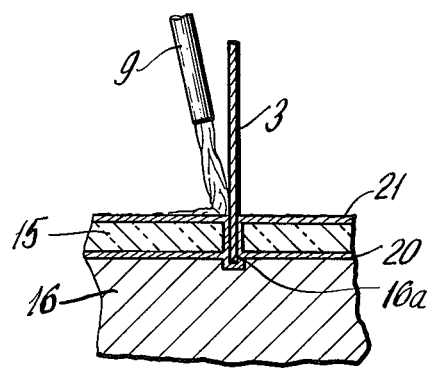

The operation of the invention will be clarified by reference to FIG. 5 wherein the sheet glass 15 is shown on the base member 16 and frozen thereto by an intermediate thin layer of ice 20. Water cooled to a temperature only slightly above the freezing temperature of water flows from nozzle 9 against the blade 3 and over the surface of the glass. It immediately forms a thin scale 21 of ice, since the glass and base are at a lower temperature than the freezing point.

As cutting proceeds, blades 3 will slightly groove the base member as indicated at 16a. This is in no way harmful and I have found that groove 16a immediately fills with the cooling fluid which freezes as the blade moves away from the area. The presence of grooves 16a from previous cuttings is in no way detrimental to the operation, and does not affect the support of the glass sheets for subsequent cutting operations.

I have found unexpectedly that the freezing method shown, together with the scale of ice formed over the top of the glass sheet from the cooling water prevents any type of chipping on either top or bottom surfaces and protects the glass during the handling and cutting operation. Since the cutting operation only takes 2 or 3 minutes, it is possible to perform gang cuts in two different directions without refreezing the glass. Subsequent to cutting, the glass and base member are removed, simply allowed to thaw and the multiple pieces of glass may be used without further cleaning or preparation.

While there has been disclosed what has been considered herein to be the preferred embodiment of the invention, other modifications will occur to those skilled in the art, and it is desired to include in the appended claims all such modifications as fall within the true spirit and scope of the invention.

What is claimed is:

1. A process for holding and cutting sheet glass, comprising the steps of:
    cooling a glass sheet and a base member together with a liquid to freeze them together,
    providing a cooling fluid comprising the same liquid at a temperature just above the freezing point of the liquid,
    flowing said liquid over the sheet glass to cause it to form a frozen scale completely enclosing the top surface of the glass,
    cutting said glass sheet with a rotary blade, while cooling the blade and glass sheet with the same liquid, and
    allowing the liquid to thaw and removing the pieces of cut glass.

2. The combination according to claim 1, wherein the liquid is water.

3. The combination according to claim 1, wherein said rotary blades perform a multiple gang cut of the glass sheet.

4. The combination according to claim 1, wherein said base member is selected from the group consisting of brass, aluminum, titanium, Kovar, and stainless steel, and wherein the liquid is water.

5. The combination according to claim 1 wherein an intermediate liquid retaining member is interposed between the base member and the glass to retain the liquid during freezing.

6. The combination according to claim 1, wherein the base member and glass sheet are placed together in the presence of water and cooled by placing on dry ice.

* * * * *